C. T. HENDERSON.
PROCESS OF CHLORIN LIQUEFACTION.
APPLICATION FILED FEB. 10, 1917.
1,338,654.
Patented Apr. 27, 1920.
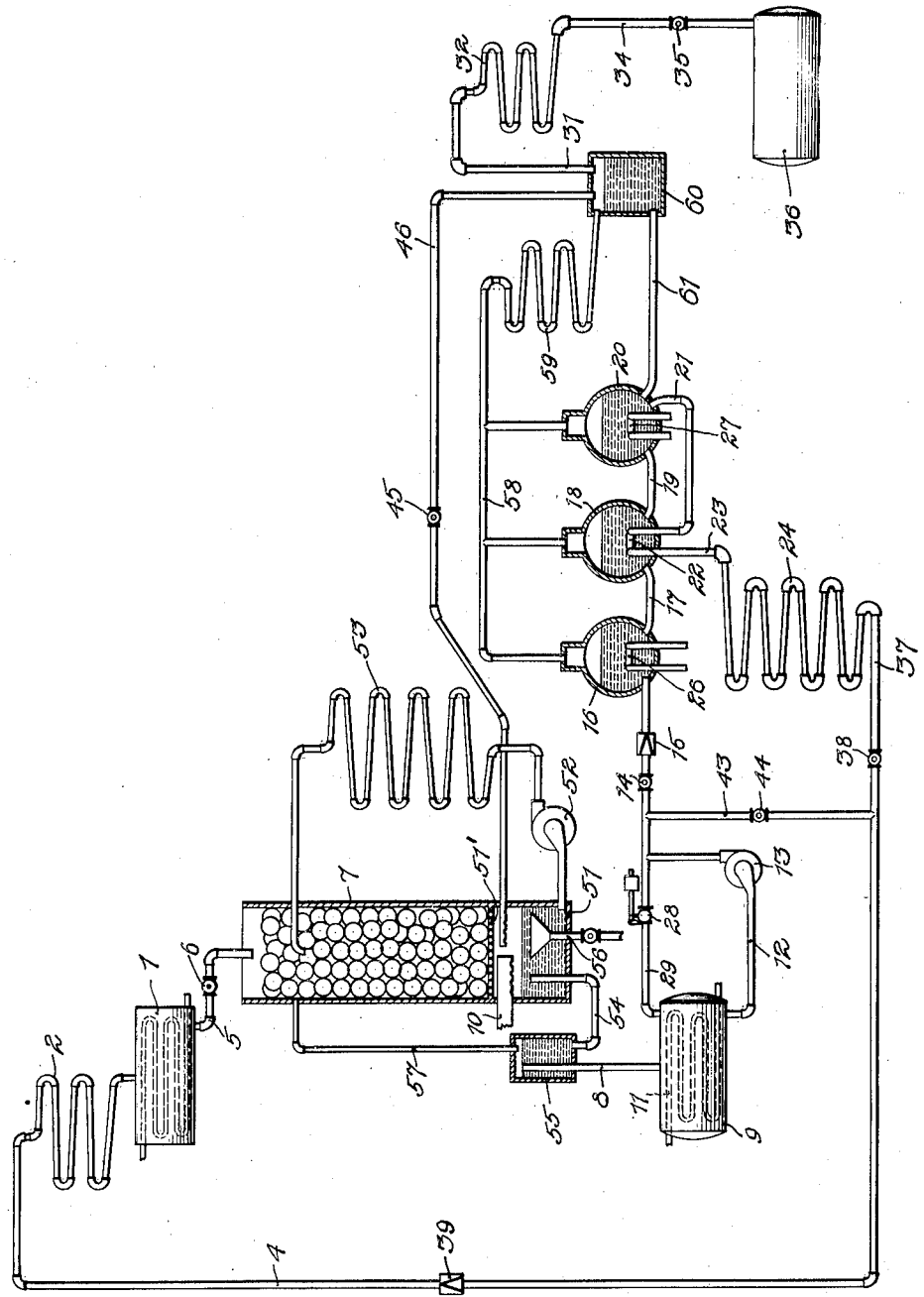
INVENTOR.
Clark T. Henderson
By Brown, Hanson & Boettcher
ATTORNEYS.

UNITED STATES PATENT OFFICE.

CLARK T. HENDERSON, OF MILWAUKEE, WISCONSIN, ASSIGNOR TO NIAGARA SMELTING CORPORATION, OF NIAGARA FALLS, NEW YORK, A CORPORATION OF NEW YORK.

PROCESS OF CHLORIN LIQUEFACTION.

1,338,654.　　　Specification of Letters Patent.　　Patented Apr. 27, 1920.

Application filed February 10, 1917. Serial No. 147,7··

*To all whom it may concern:*

Be it known that I, CLARK T. HENDERSON, a citizen of the United States, residing at Milwaukee, in the county of Milwaukee and State of Wisconsin, have invented a certain new and useful Improvement in Processes of Chlorin Liquefaction, of which the following is a full, clear, concise, and exact description, reference being had to the accompanying drawing, forming part of this specification.

My invention relates to the liquefaction of chlorin and contemplates an improved method thereof.

Chlorin gas may be liquefied at atmospheric pressure by refrigeration to approximately minus 35 degrees centigrade or at normal atmospheric temperatures by compression to several atmospheres. A compromise between the two methods appears to be the usual method of liquefaction, the chlorin being compressed to about 2.23 atmospheres and refrigerated to approximately minus 15 degrees centigrade. Heretofore it has been the general practice to secure the compression of the chlorin by means of gas pumps. These pumps are necessarily of very special construction and require high maintenance. In my improved process the chlorin compressor is entirely eliminated.

My invention provides for the dissolving of chlorin in cooled carbon tetrachlorid. The chlorin is then driven off by raising the temperature of the solvent, the gas driven off being confined so as to set up a pressure. My invention may also provide, inherently, for the purification of the chlorin by reason of the selection of a solvent which will not dissolve the impurities in the chlorin under the proposed conditions.

Carbon tetrachlorid will dissolve, at minus 15 degrees centigrade, approximately 122 volumes of chlorin at atmospheric pressure and will give up approximately 100 volumes of this chlorin when heated to approximately 100 degrees centigrade, even though the solution be under a pressure of 45 pounds to the square inch. Carbon tetrachlorid is not a good solvent for carbon dioxid, air or hydrogen, the usual diluents of commercial chlorin, nor is it miscible with water, and, at any pressures within the desired working limits for chlorin liquefaction, the boiling point of carbon tetrachlorid is materially higher than the temperature at which the chlorin gas is driven off.

The foregoing paragraphs set forth my invention in its broader aspects. More specifically my invention lies in incorporating these broader aspects in a continuous process, and the apparatus illustrated in the accompanying drawing provides for these specific features but can of course be altered or modified without departing from the spirit and scope of my invention as set forth in the appended claims.

A refrigerated storage tank for the carbon tetrachlorid is indicated at 1, this storage tank being supplied from a refrigerating apparatus 2, wherein the carbon tetrachlorid is cooled to minus 15 degrees centigrade. I have shown the refrigerating apparatus schematically, the carbon tetrachlorid being cooled with carbon dioxid or any of the other well known refrigerating mediums in one of the well-known manners. The carbon tetrachlorid reaches coils 2 by means of the pipe 4, which will later be referred to. The storage tank 1 is provided with the outlet pipe 5 and discharge regulating valve 6, this outlet pipe discharging into the absorption tower 7, the valve 6 being so set as to pass carbon tetrachlorid into the tower at the proper rate. The top of the tower is open, as shown, and the bottom thereof is connected, as will be described with a storage tank 9. Commercial chlorin gas is fed to the absorption tower 7 at a point near the bottom thereof by means of a pipe 10, the gas rising in the tower and coming in contact with the carbon tetrachlorid which flows from the pipe 5. The absorption tower 7 is filled with suitable broken material for the purpose of creating a large amount of surface over which the carbon tetrachlorid will pass.

The carbon tetrachlorid is fed to the absorption tower at such a rate that before the chlorin reaches the top of the tower it will be dissolved by the carbon tetrachlorid, the solution being led, as will be described, to the storage tank 9 where it is kept at minus 15 degrees centigrade, by the action of a suitable cooling medium in the refrigeration coils 11.

It is obvious that in the process of my invention any ordinary diluents will pass through the absorbing tower 7 and escape from the top thereof, and in this way the chlorin is substantially freed of any impurities which either do not dissolve in the solvent at all or which do not dissolve therein at the same rate or under the same circumstances at which and under which chlorin dissolves therein.

The solution of the chlorin in the carbon tetrachlorid is accompanied by the generation of heat and it is therefore necessary to refrigerate the absorbing tower to compensate for this generation of heat and to maintain the carbon tetrachlorid at a temperature of substantially minus 15 degrees centigrade.

The tower filling is supported by a perforated plate 51', the chlorin being discharged from pipe 10 underneath this plate and the gas rising through the perforations. The carbon tetrachlorid-chlorin solution drips through these same perforations and collects in the compartment 51 below. A pump 52 continuously draws the solution from this compartment and discharges it through refrigerated coils 53 into the absorption tower at a point near the top. In this way the heat of solution is removed and the tower maintained at approximately minus 15 degrees centigrade. The compartment 51 is connected by pipe 54 with auxiliary chamber 55 connected, in turn, by pipe 8 to storage tank 9. The top of pipe 8 is higher than that of pipe 54. Consequently the level of liquid in compartment 51 is always materially above the opening in pipe 54 when liquid is passing out of compartment 51 into chamber 55, and no surface liquid is drawn into chamber 55. This is important as any moisture which may be in the chlorin will be transformed into ice in compartment 51 and will float on the surface of the carbon tetrachlorid-chlorin solution. The accumulation of ice may be drawn off from time to time through funnel mouthed pipe 56 whose top level is lower than the top of pipe 8. Chamber 55 is vented through pipe 57 to prevent the formation of a gas lock on chamber 55 which might interfere with its functions. Thus, it will be seen, the moisture content is removed and the carbon-tetrachlorid-chlorin solution passes into storage tank 9 at the same rate as carbon tetrachlorid passes into tower 7 through feed pipe 5.

From the storage tank 9, which, as before stated is refrigerated to a temperature of minus 15 degrees centigrade, the solution is drawn through the outlet pipe 12 by means of a pump 13, which delivers through a hand valve 14 and a check valve 15 to a generator drum 16. The generator drum 16 is connected by means of a cross pipe 17 with a second generator drum 18, and the generator drum 18 is connected by means of a cross pipe 19 with the generator drum 20. The outlet pipe 21 of the generator drum 20 is connected with a coil 22 in the generator drum 18, for heating purposes, as will be described, the other end of this coil being connected by means of a pipe 23 to a cooler 24 subject to cold water for heat absorption purposes.

The level of the solution in the generator drums 16, 18 and 20 will be substantially the same and in practice should be maintained about one-third less than complete filling. Under operating conditions this remaining one-third of the volume of these drums will be available for chlorin which is driven out of the carbon tetrachlorid-chlorin solution by heating, as will be described.

The carbon tetrachlorid-chlorin solution will enter the generator drum 16 at approximately a temperature of approximately minus 15 degrees centigrade, and in this first generator drum the solution is warmed to approximately plus 15 degrees centigrade by means of the circulation of water at about 20 degrees centigrade through the heat coils 26.

In the generator drum 20 the solution is maintained at approximately 100 degrees centigrade by means of steam circulated in heating coil 27. The carbon tetrachlorid which discharges from the generator drum 20 at a temperature of approximately 100 degrees centigrade through pipe 21 is led back to the heating coil 22 of the generator drum 18 for the double purpose of accomplishing a reduction in temperature of the chlorin freed carbon tetrachlorid and the raising of the temperature of the carbon tetrachlorid-chlorin solution in the generator drum 18. The contents of the generator drums are kept under a suitable pressure, approximately 2.23 atmospheres if chlorin is being refrigerated to minus 15 degrees centigrade. Over pressure valve 28 in by-pass pipe 29 is adjusted to a predetermined maximum pressure, say 60 pounds to the square inch, and, if the pressure in the generator drums exceeds this value, pump 13 will discharge back into tank 9 until such time as the pressure in the generator drums falls below this maximum.

The application of heat to the carbon tetrachlorid-chlorin solution drives the chlorin therefrom, a considerable portion of the freed chlorin being driven off in the generator drum 16, a further portion being driven off in the generator drum 18, and substantially the entire remaining portion being driven off in the generator drum 20. The maintenance of the level of carbon tetrachlorid-chlorin solution in the three generator drums, as has been described, provides a space for the reception of the chlorin and the three spaces thus provided are connected together by a header 58 which is connected with a cooler 59. This cooler is maintained at approximately 25 degrees centigrade by water. The gas enters at the top and passes through the downwardly inclined pipes in which any entrained carbon tetrachlorid vapor will be condensed, and this condensation gravitates to a collecting tank 60 connected by pipe 61 with generator drum 20 to which such condensation is thus returned. Tank 60 is provided with the exit pipe 31 which leads to a refrigerated coil 32 where chlorin is reduced to a liquefaction temperature of say minus 15 degrees centigrade and condenses. The liquid chlorin passes from coil 32 by way of the pipe 34, which is controlled by a valve 35 and to which a collecting tank 36 is attached.

The chlorin freed carbon tetrachlorid which comes from the generating drum 20 passes through the heating coils of the generating drum 18, as has been described, and thence to the water cooler 24, where, as will be understood, it will be under the same pressure as the chlorin gas occupying the upper parts of the three generating drums.

As is now clear, the chlorin is driven from the solution in three stages, the first at a temperature of approximately 15 degrees centigrade, the last at approximately 100 degrees centigrade, and the intermediate stage at approximately 58 degrees centigrade. The freed carbon tetrachlorid will therefore emerge from the heating coils of the generating drum 18 at approximately 58 degrees centigrade and in the cooler 24 it is reduced to approximately 25 degrees centigrade. The carbon tetrachlorid passes from the discharge end of the cooler 24 by means of an exit pipe 37 controlled by a valve 38, and thence through the check valve 39 back to the pipe 4 which leads to the primary refrigerating device 2, mentioned at the beginning of this description. It will thus be seen that the carbon tetrachlorid circulates from and back to the primary storage tank 1, going first to the absorption tower 7 where it receives the chlorin, then on through the tank 9 and pump 13 to the generating drums where it is freed of the chlorin, then to the cooler 24, and then back to the refrigerating device 2, from which the primary supply of tank 1 is fed.

A pipe 43 is connected between the connection from the pump 13 with the generating devices and the pipe 37, this pipe obviously shunting the generator system but being provided with a normally closed valve 44. In starting up the system it may be desirable to insure circulation of the carbon tetrachlorid before turning in the chlorin or before desiring to operate the generating devices, and in such case the valve 44 is opened, with the obvious result.

In case of the presence of air in the system when starting up or in case of the accumulation of inert gases in the generating drums, the gas in the system may be blown back into the absorbing tower by opening the valve 45 in the bleeder pipe 46 which leads from the tank 60 to the absorbing tower. Any chlorin contained in such blown off gas is reabsorbed in the tower while the inert diluent gases pass out at the top.

It will be obvious to those skilled in the art that certain features of the invention may be secured without the use of the pump 13, a gravity head between tank 9 and generator drums 16, 18 and 20 being sufficient and feasible under certain circumstances. It will also be clear that if continuous operation is not insisted upon the matter of overcoming the pressure in generator drums 16, 18 and 20 may be dismissed. It is feasible to get the solution into the generating system and then operate that independently to get the generating action and liquefaction by pressure. I mention these facts so that the meaning of the appended claims may be entirely clear, certain features of the invention being capable of practical and advantageous employment without the employment of others.

I claim:

1. The process of chlorin liquefaction which comprises dissolving chlorin in carbon tetrachlorid and then driving off the chlorin into a condenser where it is liquefied by the pressure thus produced.

2. The process of liquefying chlorin which comprises circulating carbon tetrachlorid, introducing the chlorin into the carbon tetrachlorid at one point in the circuit, and driving the chlorin into a condenser at another point in the circuit.

3. The process of liquefying chlorin which comprises circulating carbon tetrachlorid, introducing the chlorin into the carbon tetrachlorid at one point in the circuit, and driving the chlorin into a condenser at another point in the circuit, pressure being applied to the circulating body between said points, and the chlorin being liquefied by the pressure produced.

4. The process of chlorin liquefaction which comprises dissolving chlorin in cooled carbon tetrachlorid under atmospheric pressure and then increasing the temperature of the solution to drive off the chlorin into a cooled condenser where it is liquefied by the pressure thus produced.

5. The process of chlorin liquefaction which comprises feeding cooled carbon tetrachlorid into the top of an absorption tower, feeding chlorin gas into the bottom of said tower, and then increasing the temperature of the solution coming from said tower to drive off the chlorin into a cooled condenser where it is liquefied by the pressure thus produced.

6. The process of chlorin liquefaction which comprises dissolving chlorin in cooled carbon tetrachlorid, then increasing the temperature of the solution to drive off a portion of the chlorin, and then further increasing the temperature to drive off a further portion of the chlorin, the chlorin being led to a cooled condenser where it is liquefied by the pressure thus produced.

7. The process of chlorin liquefaction which comprises dissolving chlorin in cooled carbon tetrachlorid, then increasing the temperature of the solution in successive stages of successively greater temperatures to drive off the chlorin into a cooled condenser where it is liquefied by the pressure thus produced.

8. The process of chlorin liquefaction which comprises dissolving chlorin in cooled carbon tetrachlorid, then increasing the temperature of the solution in successive stages of successively greater temperatures to drive off the chlorin into a cooled condenser where it is liquefied by the pressure thus produced, the heat in the chlorin freed carbon tetrachlorid coming from a succeeding stage being utilized to provide the heat for a preceding stage.

9. The process of chlorin liquefaction which comprises dissolving chlorin in cooled carbon tetrachlorid, then increasing the temperature of the solution to drive off the chlorin, then reducing the temperature of the chlorin, and then further reducing the temperature in a closed condenser subject to pressure.

10. The process of chlorin liquefaction, which comprises dissolving chlorin in carbon tetrachlorid cooled to approximately minus 15 degrees centigrade, and then increasing the temperature of the solution in stages to 100 degrees centigrade, thereby driving off the chlorin into a closed condenser cooled to minus 15 degrees centigrade where the chlorin is liquefied by the pressure produced.

11. The process of gas liquefaction which comprises feeding a solvent near the top of an absorption tower, feeding a gas into said tower near the bottom thereof, maintaining a body of the solution at the bottom of said tower, withdrawing a portion of said body and cooling it and refeeding it into the tower near the top thereof, and driving the gas from another portion of said body into a condenser.

12. The process of gas liquefaction which comprises feeding a solvent near the top of an absorption tower, feeding a gas into said tower near the bottom thereof, maintaining a body of the solution at the bottom of said tower, withdrawing a portion of said body and cooling it and refeeding it into the tower near the top thereof, and then maintaining said body at a definite level by permitting an overflow, and driving the gas contained in the overflow therefrom into a condenser.

13. The process of gas absorption which comprises feeding a solvent into the top of an absorption tower, feeding a gas into said tower near the bottom thereof, maintaining a body of the solution at the bottom of said tower, and withdrawing a portion of said body and cooling it and refeeding it into the tower near the top thereof.

14. The process of chlorin liquefaction which comprises dissolving chlorin in a solvent, then driving off the chlorin from a body of said solvent, then cooling the gas thus driven off first to condense any entrained solvent vapor and then to condense the chlorin, and collecting the condensed solvent.

15. The process of chlorin liquefaction which comprises dissolving chlorin in a solvent, then driving off the chlorin from a body of said solvent, then cooling the gas thus driven off first to condense any entrained solvent vapor and then to condense the chlorin, and returning the condensed solvent to said body of solution.

In witness whereof I hereunto subscribe my name this 7th day of February, A. D. 1917.

CLARK T. HENDERSON.